United States Patent [19]
Fujiki

[11] Patent Number: 5,108,826
[45] Date of Patent: Apr. 28, 1992

[54] INTERIOR MATERIAL FOR CARS

[75] Inventor: Nobuo Fujiki, Shiga, Japan

[73] Assignee: Japan Vilene Company, Ltd., Tokyo, Japan

[21] Appl. No.: 362,911

[22] Filed: Jun. 8, 1989

[30] Foreign Application Priority Data

Jan. 14, 1987 [JP] Japan .................. 62-4348[U]

[51] Int. Cl.⁵ .................................. B44D 1/02
[52] U.S. Cl. .................. 428/212; 428/287; 428/290; 428/286; 428/300; 428/280; 428/96; 428/282
[58] Field of Search ........... 428/300, 212, 287, 290, 428/286

[56] References Cited

U.S. PATENT DOCUMENTS

| | | | |
|---|---|---|---|
| 3,870,557 | 3/1975 | Fink et al. | 428/290 |
| 4,251,581 | 2/1981 | Schopp et al. | 428/290 |
| 4,284,680 | 8/1981 | Awano et al. | 428/280 |
| 4,329,387 | 5/1982 | Goodrich et al. | 428/196 |
| 4,382,987 | 5/1983 | Smart | 428/212 |
| 4,397,899 | 8/1983 | Marsh | 428/290 |
| 4,405,341 | 9/1983 | Jaschek et al. | 428/212 |
| 4,424,250 | 1/1984 | Adams et al. | 428/288 |
| 4,451,315 | 5/1984 | Miyazaki | 428/290 |
| 4,517,323 | 5/1985 | Ferguson et al. | 428/212 |
| 4,522,203 | 6/1985 | Mays | 428/287 |
| 4,568,581 | 2/1986 | Peoples, Jr. | 428/212 |
| 4,569,880 | 2/1986 | Nishiyama et al. | 428/212 |
| 4,818,586 | 4/1989 | Smith et al. | 428/212 |
| 4,908,176 | 3/1990 | Kato | 428/290 |

FOREIGN PATENT DOCUMENTS

| | | |
|---|---|---|
| 0088182 | 5/1985 | Japan . |
| 1297139 | 12/1986 | Japan . |
| 2236883 | 10/1987 | Japan . |
| 2096195 | 10/1982 | United Kingdom . |

Primary Examiner—George F. Lesmes
Assistant Examiner—Beverly A. Pawlikowski
Attorney, Agent, or Firm—Armstrong, Nikaido, Marmelstein, Kubovcik & Murray

[57] ABSTRACT

An interior material for cars comprising a needle punched felt of which both side surfaces are impregnated with synthetic resin emulsions, wherein the minimum film forming temperature of a synthetic resin emulsion (a) impregnated into one side surface of the needle punched felt is lower than that of a synthetic resin emulsion (b) impregnated into the other side surface of the needle punched felt. The interior material for cars of the present invention is cheap and has excellent rigidity.

10 Claims, 1 Drawing Sheet

INTERIOR MATERIAL FOR CARS

BACKGROUND OF THE INVENTION

The present invention relates to an interior material for cars, and more particularly to an interior material for cars which can be suitably used as a luggage compartment carpet, and the like.

Conventionally, as the interior material for cars such as a luggage compartment carpet, a material which is produced by bonding a surface material having a soft feeling with a base material having a large mechanical strength, has been used.

Usually, a needle punched felt of which one side surface is backed with a resin has been used as a surface material of the interior material for cars. However, because the surface material is poor in rigidity when the surface material is used singly, as an interior material for cars comprising the surface material, an interior material produced by molding to unite the surface material and a base material such as a paper board, a resin board or the like with an adhesive agent such as a hot melt material is used.

However, as mentioned above, since both the surface material and the base material are needed for the interior material for cars, there are compulsively occurred the problems that the process for producing the interior material is complicated and therefore, the cost comes to be high.

Also, a needle punched felt of which one side surface is impregnated with a resin can be used as a interior material for cars. However, in that case, there is a problem that the area weight of the needle punched felt should be increased in order to give a needle punched felt having a strength sufficient for an interior material, and as the results, a high cost of the product is required.

The object of the present invention is to solve the above-mentioned problems and to provide an interior material for cars which is cheap and has a high rigidity.

These and other objects of the present invention will become apparent from the description hereinafter.

SUMMARY OF THE INVENTION

In accordance with the present invention, there is provided an interior material for cars comprising a needle punched felt of which both side surfaces are impregnated with synthetic resin emulsions, wherein the minimum film forming temperature of a synthetic resin emulsion (a) impregnated into one side surface of the needle punched felt is lower than that of a synthetic resin emulsion (b) impregnated into the other side surface of the needle punched felt.

DETAILED DESCRIPTION

Figure 1:
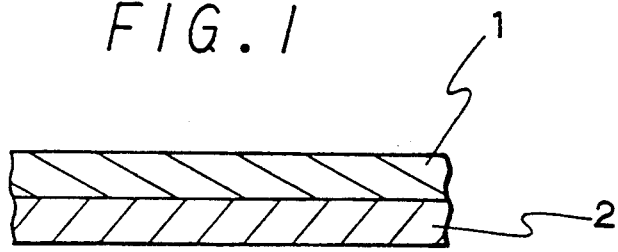
FIG. 1 is a schematic sectional view of the interior material for cars produced in Example 1.

The interior material for cars of the present invention is produced by impregnating synthetic resin emulsions into both side surfaces of the needle punched felt.

Examples of a fiber used in the needle punched felt are, for instance, synthetic fibers such as a polyester fiber, a polypropylene fiber, a polyamide fiber and an ethylene-vinylacetate copolymer fiber; semisynthetic fibers such as a rayon fiber and an acetate fiber; and natural fibers such as cotton and wool. Among them, the polyester fiber is particularly suitably used in the interior material for cars since the polyester fiber is excellent in weather resistance, light resistance, heat resistance, abrasion resistance, and the like.

The thickness and the area weight of the needle punched felt cannot be absolutely determined since the thickness and the area weight depend upon the kinds of fibers used in the needle punched felt and the strength required for the interior material for cars. However, it is suitable that the thickness is usually adjusted to 1 to 10 mm, preferably 2 to 8 mm, and the area weight is adjusted to 100 to 900 g/m$^2$. The above-mentioned needle punched felt can be needle punched only from one side thereof or from both sides thereof. When an interior material for cars having a soft feeling is required, a felt which is needle punched only from one side thereof is preferably used.

As mentioned above, both side surfaces of the interior material for cars of the present invention are impregnated with synthetic resin emulsions. The synthetic resin emulsion impregnated into the one side surface of the interior material (hereinafter referred to as "synthetic resin emulsion (a)") has a lower minimum film forming temperature than that of the synthetic resin emulsion impregnated into another side surface of the interior material (hereinafter referred to as "synthetic resin emulsion (b)").

The reason why two kinds of synthetic resin emulsions (a) and (b) are used is to give a soft feeling to one side surface of the interior material, in comparison with the rigidity of the whole interior material, by impregnating the one side surface with the synthetic resin emulsion (a).

The terminology "minimum film forming temperature of the synthetic resin emulsion" in the specification is intended to refer to the lowest temperature which can be applied to the impregnated needle punched felt such that water contained in the synthetic resin emulsion evaporates or penetrates into an adherend, i.e., the needle punched felt and the resin remaining after separation of said water forms into a film.

It is suitable that the above-mentioned minimum film forming temperature of the synthetic resin emulsion (a) is 0° to 50° C., more preferably 30° to 50° C. When the minimum film forming temperature of the synthetic resin emulsion (a) is less than 0° C., there is a tendency that suitable rigidity is not imparted to the needle punched felt. When the temperature is more than 50° C., there is a tendency that the surface feeling of the obtained interior material becomes too hard.

The reason why the synthetic resin emulsion (a) is used in the interior material of the present invention is to impart rigidity to the needle punched felt while maintaining a soft feeling on the surface of the interior material.

Examples of the synthetic resin emulsion (a) are, for instance, emulsions of acrylic acid ester resins of which acrylic acid ester is butyl acrylate, methyl methacrylate, methyl acrylate, ethyl acrylate, or the like.

It is preferable that the thickness of the layer impregnated with the synthetic resin emulsion (a) in the needle punched felt is within a range of 20 to 60% of the thickness of the needle punched felt. When the above thickness is less than 20% of the needle punched felt, there are tendencies that the feeling of the surface of the interior material is hard and the interior material is poor in cushioning property. When the above thickness is more than 60% of the needle punched felt, there is a tendency that suitable rigidity would not be imparted to the interior material.

It is preferable that the needle punched felt is impregnated with the synthetic resin emulsion (a) so that the ratio of the weight of the needle punched felt (hereinafter referred to as "F") to the weight of the solid component of synthetic resin emulsion (a) (hereinafter referred to as "$B_1$") (hereinafter the ratio is referred to as "$F/B_1$") is 70/30 to 95/5, more particularly 80/20 to 90/10.

When the $F/B_1$ is less than 70/30, there is a tendency for the surface of the obtained interior material to be hard and a soft feeling is not imparted. When the $F/B_1$ is more than 95/5, there is a tendency that the interior material is so poor in rigidity, after being subjected to molding, that the shape stability of the interior material deteriorates.

In the present invention, when greater rigidity is required for an obtained interior material for cars, for instance, a powder of calcium carbonate, aluminium hydroxide or the like can be added to the synthetic resin emulsion (a) within a range of not more than 40% by weight on the basis of the synthetic resin emulsion (a) as occasion demands.

It is suitable to use the synthetic resin emulsion (b) having a minimum film forming temperature of not less than 50° C., more preferably 50° to 70° C. When the minimum film forming temperature of the synthetic resin emulsion (b) is less than 50° C., there is a tendency that the interior material after being subjected to molding lacks rigidity. When the minimum film forming temperature of the synthetic resin emulsion (b) is more than 70° C., there are tendencies that a film of the synthetic resin emulsion (b) is not formed, that the resin contained in the synthetic resin emulsion (b) would not be fixedly bonded to the surface of the fiber of the needle punched felt and that the fibers would not be fixedly bonded together.

Examples of the synthetic resin emulsion (b) are, for instance, emulsion of resins such as polymethyl methacrylate, polyvinylidene chloride, ethylene-vinyl chloride copolymer and styrene-butadiene copolymer, and the like. These emulsions can be used alone or in admixture thereof.

The concentration of these synthetic resin emulsions (b) varies depending upon the kinds thereof. The concentration of the resin contained in the synthetic resin emulsion (b) is usually adjusted to 5 to 65% by weight of the synthetic resin emulsion (b).

It is preferable that the needle punched felt is impregnated with the synthetic resin emulsion (b) so that the ratio of the weight of the needle punched felt (F) to the weight of the solid component of the synthetic resin emulsion (b) (hereinafter referred to as "$B_2$") (hereinafter the ratio is referred to as "$F/B_2$") is 40/60 to 95/5, more particularly 60/40 to 85/15.

When the $F/B_2$ is less than 40/60, there are tendencies that the obtained interior material has so large rigidity that the obtained interior material cannot be easily handled, and that the interior material is poor in moldability and cushioning property. When the $F/B_2$ is more than 95/5, there is a tendency that the rigidity of the interior material is too small to be used after being subjected to molding.

It is preferable that the thickness of the layer impregnated with the synthetic resin emulsion (b) in the needle punched felt is within a range of 30 to 70% of the thickness of the needle punched felt. When the thickness of the layer impregnated with the synthetic resin emulsion (b) is less than 30% of the thickness of the needle punched felt, there is a tendency that the interior material is poor in rigidity. When the thickness is more than 70% of the thickness of the needle punched felt, there are tendencies that the interior material is poor in moldability and cushioning property, and that the interior material has a defect in discoloring with the passage of time.

As mentioned above, the interior material for cars of the present invention has rigidity required in the interior material for cars since a layer impregnated with the synthetic resin emulsion (b) is provided in one side surface of the needle punched felt. Also, the interior material for cars of the present invention has a suitable soft feeling on the surface thereof required of an interior material for cars and a rigidity of the whole interior material since a layer impregnated with the synthetic resin (a) is provided in the other surface of the needle punched felt.

Figure 2:
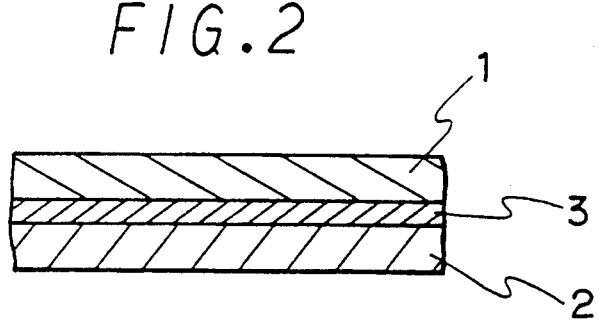
FIG. 2 is a schematic sectional view showing another embodiment of the interior material for cars of the present invention.

A sectional view illustrating one embodiment of the interior material for cars of the present invention is shown in FIG. 1. In FIG. 1, numeral 1 denotes a layer impregnated with the synthetic resin emulsion (a) which is to be a surface side of the interior material for cars, numeral 2 denotes a layer impregnated with the synthetic resin emulsion (b) which is to be a backside of the interior material contacting with a car body. The needle punched felt used in the interior material for cars of the present invention shown in FIG. 1 is impregnated with the resin emulsion (a) and the resin emulsion (b) over the entire body thereof. However, in the present invention, there is no necessity that the synthetic resin emulsions are impregnated into the entire needle punched felt. Accordingly, a layer which is not impregnated with the synthetic resin emulsions may be present in the needle punched felt as shown in FIG. 2.

As mentioned above, since the interior material for cars of the present invention has excellent rigidity (of not less than 1.5 kg/30 mm.width), the interior material for cars can be used for an interior material such as a luggage compartment carpet and the like after being subjected to cutting and molding without providing any other base materials for reinforcing the interior material for cars.

The present invention is more specifically described and explained by means of the following Examples. It is to be understood that the present invention is not limited to the Examples, and various changes and modifications may be made in the invention without departing from spirit and scope thereof.

EXAMPLE 1

After a polyester spun dyed fiber (fineness: 6 deniers, fiber length: 64 mm) was carded to form a web (area weight: 200 g/m$^2$), one side surface of the web was needled (needle density: 290 strokes/cm$^2$, needle depth: 10 mm) to give a needle punched felt. Then, as a synthetic resin emulsion, styrene-butadiene copolymer emulsion (minimum film forming temperature: 60° C.) containing 30% by weight of calcium carbonate powder (average particle size: 0.1 μm) was impregnated into the needle punched surface of the needle punched felt, adjusting the thickness of the impregnated layer in the needle punched felt to 50% of the thickness of the needle punched felt (adhered solid content: 60 g/m$^2$). After that, the needle punched felt was dryed with a dryer. Next, butyl acrylate emulsion (minimum film forming temperature: 40° C.) was impregnated into the surface, which is not needle punched, of the needle punched felt, adjusting the thickness of the impregnated layer in the needle punched felt to 50% of the thickness of the needle punched felt (adhered solid content: 40 g/m$^2$). After that, the needle punched felt was dryed with a dryer to give an interior material for cars (thickness: 3.3 mm, area weight: 300 g/m$^2$) having a constitution illustrated in FIG. 1. With respect to the obtained interior material for cars, physical properties such as light resistance, heat resistance and flexural rigidity were measured in accordance with the following measuring methods. The results are shown in Table 2.

Light Resistance

The obtained interior material was cut to obtain test pieces (width: 60 mm, length: 200 mm). After the test piece was exposed in an atmosphere having a temperature of 83° C. for 400 hours by means of Fade-O-Meter, the test piece was taken out from the Fade-O-Meter and the plane of the test piece was exposed to the light of an illuminance of about 1000 lx by means of standard light source C according to JIS Z8701 (method for color specification in accordance with standard colorimetric system). The difference between colors of the test piece before and after the test was examined by comparing the each color of the test piece with the color indicated in the color chip of a grey scale for measuring color fading regulated in JIS L0804 (grey scale for measuring color fading) with the naked eyes at a distance of about 25 cm from the test piece. The results are shown as the grades in accordance with the criterion for judgement shown in Table 1. When the light resistance of the test piece is not less than grade 3, it can be said that the obtained interior material for cars can be practically used.

TABLE 1

| Grades | Criterion for judgement |
| --- | --- |
| 5 | The color fading is about No. 5 grade of the grey scale. |
| 4 | The color fading is about No. 4 grade of the grey scale. |
| 3 | The color fading is about No. 3 grade of the grey scale. |
| 2 | The color fading is about No. 2 grade of the grey scale. |
| 1 | The color fading is No. 1 grade of the grey scale or over the same grade. |

Heat Resistance

The obtained interior material for cars was exposed in an atmosphere having a temperature of 110° C. for 400 hours. The interior material for cars of which surface did not discolor can be practically used.

Flexural Rigidity

Figure 3:
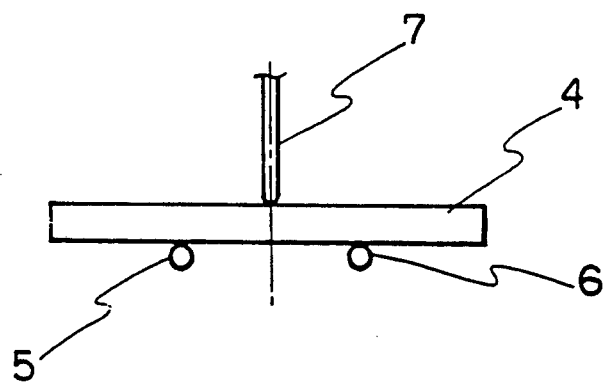
FIG. 3 is a schematic view illustrating a flexural rigidity measuring equipment used in Example 1 of the present invention and Comparative Examples 1 and 2.

The obtained interior material for cars was cut to obtain test pieces (width: 30 mm, length: 50 mm). As shown in FIG. 3, the test piece 4 was laid on the supporting point 5 and the supporting point 6 which were located at a distance of 20 mm in the flexural rigidity tester, and the push rod 7 was set on the intermediate point between supporting point 5 and the supporting point 6, then a load was applied onto the test piece 4 by means of the push rod 7, and the maximum load for bending the test piece 4 was measured. It can be said that the obtained interior material for cars can be suitable for practical uses when the test piece has a flexual rigidity of not less than 1.5 kg/30 mm.width.

COMPARATIVE EXAMPLE 1

The same procedures as in Example 1 were repeated except that same butyl acrylate emulsion having a minimum film forming temperature of 40° C. as used in Example 1 was impregnated into only the non-needled surface of the needle punched felt, adjusting the thickness of the impregnated layer to 50% of the thickness of the needle punched felt (adhered solid content: 40 g/m$^2$) instead of impregnating the both surfaces of the needle punched felt with the synthetic resin emulsions as used in Example 1, to give an interior material for cars. With respect to the obtained interior material for cars, physical properties were measured in the same manner as in Example 1. The results are shown in Table 2.

COMPARATIVE EXAMPLE 2

The same procedures as in Example 1 were repeated except that the styrene-butadiene copolymer emulsion having a minimum film forming temperature of 60° C. used in Example 1 was impregnated into only the needled surface of the needle punched felt (adhered solid content: 60 g/m$^2$) instead of impregnating into both surfaces of the needle punched felt with the synthetic resin emulsions as in Example 1, to give an interior material for cars. With respect to the obtained interior material for cars, the physical properties were measured in the same manner as in Example 1. The results are shown in Table 2.

TABLE 2

| Ex. No. | Light resistance (grade) | | Heat resistance | | Flexural rigidity (kg/30 mm · width) |
| --- | --- | --- | --- | --- | --- |
| | Surface | Backside | Surface | Backside | |
| 1 | 4 | 1 | No change observed | Discolored | 1.7 |
| Comp. Ex. 1 | 4 | 3 | No change observed | No change observed | 0.5 |
| Comp. Ex. 2 | 3 | 1 | Slightly discolored | Discolored | 0.7 |

The interior material for cars of the present invention is produced by impregnating the synthetic resin emulsions into both side surfaces of the needle punched felt. Since the obtained interior material for cars has soft feeling on the surface thereof and has a rigidity required for a base material in the backside surface thereof. Accordingly, since there is no necessity to use a base material in the interior material, the producing steps of the interior material of the present invention is free from complicate step for laminating a base material on a surface material, which has been necessary for producing conventional interior materials, and also there is an advantage that cost for producing the interior material is lowered.

Having described a specific Example of our bearing, it is believed that modification and variation of our invention are possible in light of the above teachings.

What is claimed is:

1. A material suited for use in the interior of cars comprising a needle punched felt both surfaces of which are impregnated with different synthetic resin emulsions; one surface with synthetic resin emulsion (a); and the other surface with a different synthetic resin emulsion (b); wherein the minimum film forming temperature of the synthetic resin in synthetic resin emulsion (a) is lower than the minimum film forming temperature of the synthetic resin in synthetic resin emulsion (b).

2. The material of claim 1, wherein the minimum film forming temperature of said synthetic resin in synthetic resin emulsion (a) is from 0° to 50° C.

3. The material of claim 1, wherein the minimum film forming temperature of said synthetic resin in synthetic resin emulsion (b) is not less than 50° C.

4. The material of claim 1, wherein said synthetic resin (a) has a high heat resistance when exposed to an atmosphere having a temperature of 110° C. for 400 hours such that upon being tested it shows a flexural rigidity of at least 1.5 kg/30 mm. width and a high light resistance, such that when exposed to an atmosphere having a temperature of 83° C. for 400 hours and illuminated at about 100 lx it shows a light resistance of not less than grade 3.

5. The material of claim 1, wherein said synthetic resin in synthetic resin emulsion (a) is at least one acrylic acid resin based on a monomer selected from the group consisting of butyl acrylate, methyl methacrylate, methyl acrylate and ethyl acrylate.

6. The material of claim 2 wherein said minimum film forming temperature of said synthetic resin in synthetic resin emulsion (a) is 30° C. to 50° C.

7. The material of claim 1, wherein said synthetic resin in synthetic resin emulsion (b) is at least one member selected from the group consisting of polymethyl methacrylate, polyvinylidene chloride, ethylene-vinyl chloride copolymer and styrene-butadiene copolymer.

8. The material of claim 3, wherein said minimum film forming temperature of said synthetic resin in synthetic resin emulsion (b) is 50° C. to 70° C.

9. The material claimed in claim 1 wherein said felt is needle punched from one surface and wherein said resin emulsifier (b) is impregnated through said needle punched surface.

10. An interior material for cars comprising the dried material of claim 1.

* * * * *

UNITED STATES PATENT AND TRADEMARK OFFICE
CERTIFICATE OF CORRECTION

PATENT NO.   : 5,108,826
DATED        : April 28, 1992
INVENTOR(S)  : Nobuo FUJIKI It is certified that error appears in the above-identified patent and that said Letters Patent is hereby corrected as shown below:

On the cover page, delete Item [30] in its entirety.

Signed and Sealed this

Twentieth Day of July, 1993

Attest:

MICHAEL K. KIRK

Attesting Officer

Acting Commissioner of Patents and Trademarks